(12) United States Patent
Bachorik et al.

(10) Patent No.: US 7,236,573 B2
(45) Date of Patent: Jun. 26, 2007

(54) METHOD AND APPARATUS FOR TESTING TELEPHONE SOUND QUALITY

(75) Inventors: John R. Bachorik, Alpharetta, GA (US); Joseph T. Hazeltine, Madison, AL (US); Davin J. Lee, Madison, AL (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 368 days.

(21) Appl. No.: 10/403,252

(22) Filed: Mar. 31, 2003

(65) Prior Publication Data

US 2003/0185351 A1  Oct. 2, 2003

Related U.S. Application Data

(60) Provisional application No. 60/369,540, filed on Apr. 1, 2002.

(51) Int. Cl.
*H04M 1/24* (2006.01)
*H04M 3/08* (2006.01)
*H04M 3/22* (2006.01)
*H04R 29/00* (2006.01)

(52) U.S. Cl. .............................. 379/27.01; 379/27.03; 379/22.02; 381/58

(58) Field of Classification Search .............. 379/1.01, 379/22.01, 22.02, 27.01, 27.02, 27.03, 29.1, 379/357.03, 359, 362; 381/56–58, 101
See application file for complete search history.

(56) References Cited

U.S. PATENT DOCUMENTS

| | | | |
|---|---|---|---|
| 4,862,492 A * | 8/1989 | Zwick | 379/22.02 |
| 5,539,803 A * | 7/1996 | Bhat et al. | 379/21 |
| 6,035,046 A * | 3/2000 | Cheng et al. | 381/59 |
| 6,456,694 B1 * | 9/2002 | Posthuma | 379/1.04 |
| 6,501,830 B1 * | 12/2002 | Allasia et al. | 379/3 |
| 6,625,448 B1 * | 9/2003 | Stern | 455/425 |
| 6,707,886 B2 * | 3/2004 | Erving et al. | 379/1.04 |
| 6,775,240 B1 * | 8/2004 | Zhang et al. | 370/251 |
| 2004/0184620 A1 * | 9/2004 | Johnson et al. | 381/101 |

* cited by examiner

*Primary Examiner*—Quoc Tran
(74) *Attorney, Agent, or Firm*—Lee & Hayes, PLLC

(57) ABSTRACT

A method and apparatus for testing telephone sets to determine their sound quality comprising a system for repeatedly applying a sequence of pulse tones to a test telephone where the respective tone frequencies are different and within the normal human voice range.

20 Claims, 3 Drawing Sheets

Legend

E = power supply: 48 V dc
C = capacitor: 2.0 µF ±10% non-electrolytic
L = inductor: 2.0 H minimum at 200 Hz, 100 mA dc current
R = battery feed resistance including resistance of inductor windings: 400 ohms Test Circuit for Measuring Receive Sound Quality

Legend

E = power supply: 48 V dc

C = capacitor: 2.0 µF ±10% non-electrolytic

L = inductor: 2.0 H minimum at 200 Hz, 100 mA dc current

R = battery feed resistance including resistance of inductor windings: 400 ohms

Test Circuit for Measuring Receive Sound Quality

Objective PTS Test - Reference Corded Telephone

| PTS Level | 800 Hz | 1000 Hz | 1200 Hz | Results (Pass/Fail) |
|---|---|---|---|---|
| Standard (5, 50, 5 mV peak) | Yes | Yes | Yes | Pass |

Key: Yes = tone clearly visible or audible
No = tone suppressed or rounded off

Objective/Subjective PTS Test - Reference Corded Telephone

Objective PTS Test - Cordless Telephone

| PTS Level | 800 Hz | 1000 Hz | 1200 Hz | Results (Pass/Fail) |
|---|---|---|---|---|
| Standard (5, 50, 5 mV peak) | No | Yes [1] | No | Fail |

Key: Yes = tone clearly visible or audible
No = tone suppressed or rounded off

Note: 1) Objectively, the tone was rounded off ("No"), but Subjectively, the tone was clearly audible ("Yes") for an overall "Yes."

Objective/Subjective PTS Test - Cordless Telephone

METHOD AND APPARATUS FOR TESTING TELEPHONE SOUND QUALITY

RELATED APPLICATIONS

This application incorporates and claims the benefit of U.S. Provisional Application 60/369,540 filed Apr. 1, 2002.

FIELD OF THE INVENTION

This invention relates generally to telephones and more particularly to a method and apparatus for testing telephone sets to determine their sound quality.

BACKGROUND OF THE INVENTION

Telephone sets, i.e., base unit and handset, whether corded, cordless, or speakerphone, typically employ Automatic Gain Control (AGC) or other nonlinear circuits to suppress telephone line noise, static, and/or acoustic feedback. Such circuits are intended to eliminate or reduce noise that would otherwise be heard by a user at the handset speaker during a telephone communication. However, in some designs, such circuits can operate excessively with the result that the user is likely to hear a "choppy" sound quality. That is, the user may find that a far end talker with a quiet voice is difficult or impossible to understand because too many of the talker's syllables are suppressed or cutoff, resulting in the "choppy" sound.

Additionally potential sources of poor telephone sound quality include:
  Signal overload with resulting distortion
  Signal underload with resulting noise
  Insufficient digital quantization resolution and/or range
  Low digital sampling rate
  Excessive low pass and/or dynamic filtering
  Excessive cordless telephone RF carrier dropout Currently used standard acoustic tests frequently produce results that do not adequately correlate to the human perception of a telephone's sound quality. For instance, the measured audio frequency response of a telephone unit A can fail to meet specified limits and yet be ranked much higher by a typical user than a telephone unit B whose measured audio frequency response complies with the specified limits.

The present invention is directed to an improved method and apparatus intended to determine the subjective sound quality of a telephone unit.

SUMMARY OF THE INVENTION

More particularly, the present invention is directed to a system which repeatedly applies a sequence of pulse tones of different frequency and amplitude to a telephone set under test (i.e., "test telephone") to determine its sound quality.

In accordance with a preferred embodiment, each pulse tone sequence (PTS) is comprised of three tones (sine waves) which are electronically injected into the test telephone to simulate a talker's voice. More particularly, the three tones are preferably selected to have frequencies in the middle of the human voice range (e.g., 800 Hz, 1000 Hz, 1200 Hz) that most users can readily hear and distinguish.

Additionally, in accordance with the preferred embodiment, the multiple tones in each sequence have amplitudes selected to simulate a moderately quiet talker that most listeners can readily hear in a normal room environment.; In the preferred three tone sequence, the first and last tones are preferably selected to have amplitudes noticeably lower than the middle tone to simulate the lower amplitude syllables in human speech that are often lost, i.e., chopped off, in telephone communications.

DETAILED DESCRIPTION

Figure 1:
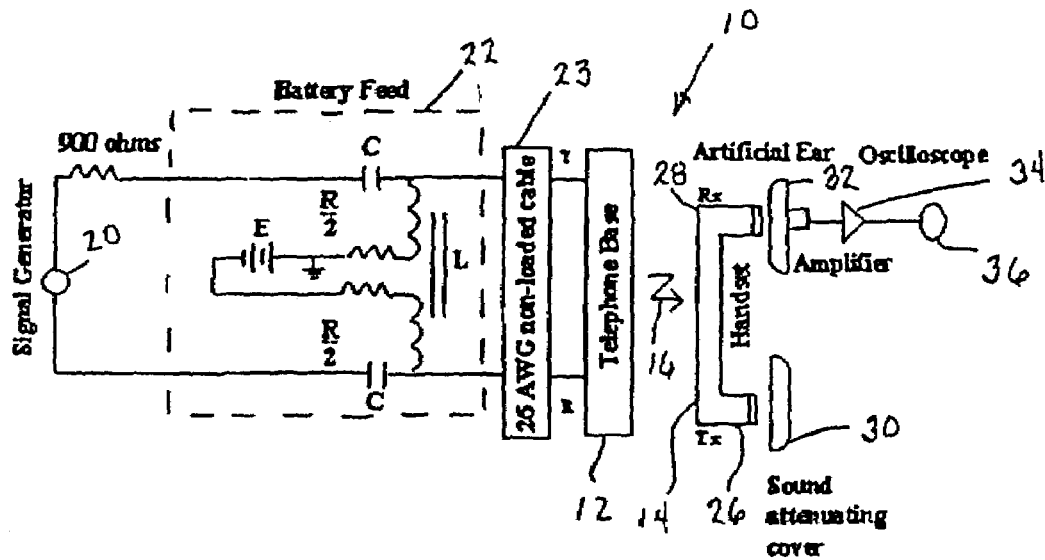
FIG. 1 is a circuit diagram of an exemplary arrangement for testing a telephone set in accordance with the present invention.

Attention is initially directed to FIG. 1 which depicts a preferred arrangement for testing a telephone set 10 in accordance with the present invention. The telephone set 10 is comprised of a base unit 12 which communicates with a cordless handset 14 via an RF link 16.

In order to perform the test to be described hereinafter, a signal generator 20 and battery feed circuit 22 are connected to electrically inject a pulse tone sequence into base unit 12 via a simulated non-loaded cable 23 for transmission to handset 14. The handset 14 typically includes a transmit, or microphone, portion 26 and a receive, or speaker, portion 28. As illustrated, the transmit portion 26 is preferably sealed with a sound attenuating cover 30.

The receive portion 28 is acoustically coupled to an artificial ear 32 which responds to applied acoustic energy to drive amplifier 34. The output of amplifier 34 is applied to an oscilloscope 36 for displaying the characteristics of the acoustic energy produced by the handset receive portion 28.

In order to test the sound quality of the telephone set 10 in accordance with the invention, a sequence of multiple pulse tones produced by signal generator 20 is repeatedly applied to base unit 12. The pulse tone sequence (PTS) is selected to simulate a moderately quiet talker in a normal environment. In accordance with a preferred embodiment of the invention, the selected pulse tone sequence is comprised of three distinct successively generated sine waves of different frequencies within the human voice range. The following specification describes a preferred embodiment of the present invention.

Preferred Test Requirements

The telephone set shall be excited by a selected three tone sequence to determine whether it clearly reproduces all three tones of the sequence. The telephone set shall be considered as passing the test if either the Objective or the Subjective PTS Test requirement is met:
  (a) Objective PTS Test—The first and third tones, at 10% of the amplitude of the middle tone, shall be evident at the oscilloscope 36. Each of the three tones shall be 200 milliseconds wide.
  (b) Subjective PTS Test—All three tones shall be clearly heard without audible suppression and without audible rounding off of any of the tones.

Standard Method of Measurement (a) The PTS test shall be performed using the test circuitry shown in FIG. 1.

(b) The signal generator 20 shall produce the pulse tone sequence (i.e., "test signal") repeatedly. Each cycle of the test signal shall include a triple-tone sequence, followed by 400 milliseconds of silence, for a total cycles duration of 1000 milliseconds (1 second). The sine wave frequencies, amplitudes, and durations shall be generated in the sequence listed in the following Table 1.

TABLE 1

PTS Test Signal Frequencies, Amplitudes, and Durations

| Sequence | 1 | 2 | 3 |
|---|---|---|---|
| Frequency | 800 Hz | 1000 Hz | 1200 Hz |
| Amplitude | 5 mV peak | 50 mV peak | 5 mV peak |
| Duration | 200 milliseconds | 200 milliseconds | 200 milliseconds |

(c) The measurement shall be made for 0 km of 26 AWG non-loaded cable as shown in FIG. 1.

(d) If the telephone handset has a Receive volume control, the control shall be set to the nominal gain level.

(e) The handset should be in an ambient noise environment no greater than 40 dB(A) Sound Pressure Level referenced to 20 micropascals, and the handset transmitter should be covered, as by cover 30.

(f) To evaluate the Objective Receive Sound Quality, an oscilloscope 36 or equivalent instrument is connected to the output of amplifier 34 and the instrument time base is adjusted to display two complete cycles of the PTS test signal. The display is adjusted so that the amplitude of the middle (1000 Hz) tone is near full scale. The relative amplitudes of the first (800 Hz) and third (1200 Hz) tones are observed and compared to the middle tone, as well as their pulse widths.

Figures 2A, 2B:
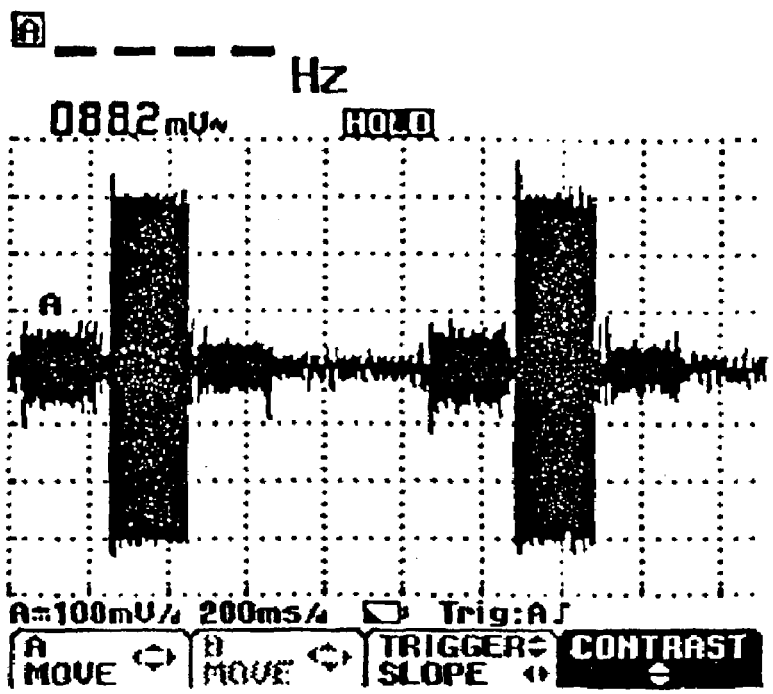
FIG. 2A depicts an oscilloscope display produced by a reference corded telephone excited by a pulse tone sequence in accordance with the present invention and FIG. 2B comprises a table describing test results associated with the display of FIG. 2A.
Figures 3A, 3B:
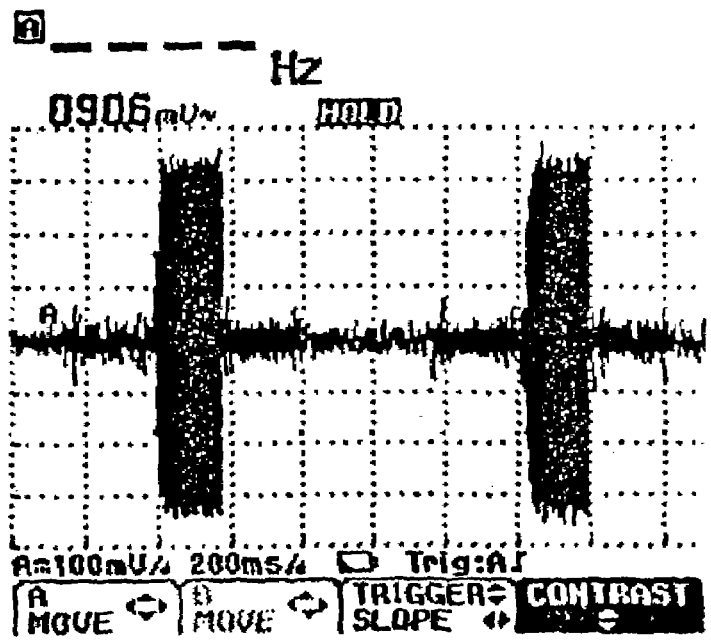
FIG. 3A depicts an oscilloscope display produced by an exemplary cordless test telephone excited by the same pulse tone sequence as used in FIG. 2A and FIG. 3B comprises a table describing test results associated with the display of FIG. 3A.

As an example, the display of a reference corded telephone which passes this test is shown in FIG. 2A. Note that the first and third tones are evident at 10% of the amplitude of the middle tone, and each tone is about 200 milliseconds wide. The display of a cordless telephone which fails this test is shown in FIG. 3A; the first and third tones are not evident, and the second tone is noticeably less than 200 milliseconds wide.

(g) To evaluate the Subjective Receive Sound Quality, a technician shall listen to the handset receiver for all three tones of the PTS test signal. A reference corded telephone should preferably be used for comparison purposes; e.g., the reference corded telephone of FIG. 2A which produces the subjective results summarized in the Table of FIG. 2B where all three tones are clearly heard by the testing technician. The performance of an exemplary cordless telephone which fails this subjective test is summarized in the Table of FIG. 3B where the first and third tones are not clearly heard, sounding suppressed or rounded off.

Expanded Measurements

To help determine the level of "choppy" sound in a telephone, the PTS test may be performed at amplitudes above and below the standard (5, 50, 5 mV peak) level; the following Table 2 lists the recommended PTS levels. All other parameters (e.g., sequence, frequency, duration, and silence) and procedures are identical to those previously discussed.

TABLE 2

Expanded PTS Test Amplitudes

| PTS Level | 800 Hz | 1000 Hz | 1200 HZ |
|---|---|---|---|
| Very High | 20 mV peak | 200 mV peak | 20 mV peak |
| High | 10 mV peak | 100 mV peak | 10 mV peak |
| Standard | 5 mV peak | 50 mV peak | 5 mV peak |
| Low | 2 mV peak | 20 mV peak | 2 mV peak |
| Very Low | 1 mV peak | 10 mV peak | 1 mV peak |

If a telephone set fails to reproduce all three tones of the PTS test signal at the Very High Level, the unit has a very high level of "choppy" sound and thus has very poor Receive Sound Quality. If a telephone reproduces all three tones of the PTS test signals at he Very Low Level, the unit has a very low level of "choppy" sound and thus has very good Receive Sound Quality.

As an example, a reference corded telephone which passes all of the expanded measurements is summarized in the following Table 3;

TABLE 3

Expanded Objective/Subjective PTS Test-Reference Corded Telephone

| PTS Level | 800 Hz | 1000 Hz | 1200 Hz | Results Pass/Fail |
|---|---|---|---|---|
| Very High (20, 200, 20 mV peak) | Yes | Yes | Yes | Pass |
| High (10, 100, 10 mV peak) | Yes | Yes | Yes | Pass |
| Standard (5, 50, 5 mV peak) | Yes | Yes | Yes | Pass |
| Low (2, 20, 2 mV peak) | Yes | Yes | Yes | Pass |
| Very Low (1, 10, 1 mV peak) | Yes | Yes | Yes | Pass |

Key:
Yes = tone clearly visible or audible
No = tone suppressed or rounded off

Note in Table 3 that all three tones are clearly reproduced at all PTS levels. A cordless telephone which fails most of the expanded measurements is summarized in Table 4.

TABLE 4

Expanded Objective/Subjective PTS Test-Cordless Telephone

| PTS Level | 800 Hz | 1000 Hz | 1200 Hz | Results Pass/Fail |
|---|---|---|---|---|
| Very High (20, 200, 20 mV peak) | Yes | Yes | Yes | Pass |
| High (10, 100, 10 mV peak) | No | Yes | Yes | Fail |
| Standard (5, 50, 5 mV peak) | No | Yes[1] | No | Fail |
| Low (2, 20, 2 mV peak) | No | Yes[1] | No | Fail |
| Very Low (1, 10, 1 mV peak) | No | No | No | Fail |

Key:
Yes = tone clearly visible or audible
No = tone suppressed or rounded off
Note:
[1]Objectively, the tone was rounded off ("No"), but Subjectively, the tone was clearly audible ("Yes") for an overall "Yes".

Note that at the High (10, 100, 10 mV peak) level, the first (800 Hz) tone is not clearly reproduced, so the result is a "Fail" for the High PTS level.

Additionally, the PTS test measurement may be repeated with longer loops (e.g., 2.7 and 4.6 km of 26 AWG non-loaded cable) to determine the level of "choppy" sound with a range of loop conditions.

From the foregoing, it should now be appreciated that a method and apparatus have been described for testing telephone sets to determine their sound quality. Although only a limited number of specific embodiments have been described, it is recognized that various modification and equivalents will occur to those skilled in the art falling within the spirit and intended scope of the invention.

The invention claimed is:

1. A method of evaluating the sound quality of a telephone set comprised of a base unit for providing an electric drive signal and a handset responsive to the drive signal for producing an acoustic output, the method comprising:
   generating an electric test signal characterized by a first pulse tone having a frequency F1 at amplitude A1, a second pulse tone having a frequency F2 at amplitude A2, and a third pulse tone having a frequency F3 at amplitude A3;
   injecting the test signal into the base unit to transmit a corresponding drive signal to the handset; and
   evaluating the sound quality of the telephone set by determining whether the acoustic output produced by the handset includes three discernibly distinct tones.

2. The method of claim 1 wherein the generating step includes generating a test signal comprised of successive cycles wherein each cycle is characterized by the successive generation of the first, second, and third pulse tones during first, second, and third pulse intervals respectively.

3. The method of claim 1 wherein said the pulse tone frequencies are related as F3>F2>F1.

4. The method of claim 1 wherein the pulse tone frequencies F1, F2, F3 substantially equal 800 Hz, 1000 Hz, 1200 Hz, respectively.

5. The method of claim 1 wherein at least two of the pulse tone amplitudes are unequal.

6. The method of claim 1 wherein the ratio between the amplitudes of two of the pulse tones is greater than five.

7. The method of claim 1 wherein the ratio of the pulse tone amplitudes A1, A2, A3 is defined approximately by 1:10:1.

8. The method of claim 2 wherein each pulse tone interval has a duration of about 200 milliseconds.

9. The method of claim 2 wherein each cycle farther includes a no-pulse interval.

10. The method of claim 9 wherein each pulse tone interval has a duration of about 200 milliseconds and the no-pulse interval has a duration of about 400 milliseconds.

11. The method of claim 1 wherein evaluating the sound quality includes a person listening to the acoustic output produced by the handset to reach a subjective judgment.

12. The method of claim 1 wherein evaluating the sound quality includes using the acoustic output to produce a graphical display.

13. The method of claim 1 wherein the drive signal is transmitted to the handset via a wire.

14. The method of claim 1 wherein the drive signal is transmitted to the handset via a wireless RF link.

15. An apparatus for testing sound quality of a telephone set comprised of a base unit for providing an electric drive signal to a handset for producing an acoustic output, the apparatus comprising:
   signal generator means for supplying a test signal to the base unit characterized by a first pulse tone having a frequency F1 at amplitude A1, a second pulse tone having a frequency F2 at amplitude A2, and a third pulse tone having a frequency F3 at amplitude A3;
   the test signal being comprised of successive cycles wherein each cycle is characterized by first, second, and third pulse intervals respectively containing the first, second, and third pulse tones; and
   means responsive to the acoustic output produced by the handset for evaluating the sound quality of the telephone set by determining whether the acoustic output produced by the handset includes three discernibly distinct tones.

16. The apparatus of claim 15 wherein the test signal frequency F3 is greater than frequency F2 which is greater that frequency F1.

17. The apparatus of claim 15 wherein the pulse tone amplitudes A1, A2, A3, are not all equal.

18. The apparatus of claim 15 wherein one of the pulse tone amplitudes is greater than five times another of the pulse tone amplitudes.

19. The apparatus of claim 15 wherein the means responsive to the acoustic output includes a display device for graphically representing the acoustic output.

20. A method comprising:
   injecting an electric test signal into a base unit of a telephone to transmit a corresponding drive signal to a handset of the telephone, the test signal comprising first, second, and third successive pulse tones, the first pulse tone having a frequency F1 and an amplitude A1, the second pulse tone having a frequency F2 greater than F1 and an amplitude A2, and the third pulse tone having a frequency F3 greater than F2 and an amplitude A3, wherein A2 is at least five times higher than each of A1 and A3; and
   evaluating the sound quality of the telephone set by determining whether the acoustic output produced by the handset includes three discernibly distinct tones.

* * * * *